United States Patent
Takada et al.

(10) Patent No.: US 9,750,015 B2
(45) Date of Patent: Aug. 29, 2017

(54) COMMUNICATION SYSTEM, TERMINAL, AND BASE STATION

(71) Applicant: FUJITSU LIMITED, Kawasaki-shi, Kanagawa (JP)

(72) Inventors: Kenji Takada, Yokosuka (JP); Bun Kimura, Yokohama (JP); Mamoru Takahashi, Yokohama (JP); Toshiyuki Ichinohe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 88 days.

(21) Appl. No.: 14/693,932

(22) Filed: Apr. 23, 2015

(65) Prior Publication Data

US 2015/0341928 A1 Nov. 26, 2015

(30) Foreign Application Priority Data

May 21, 2014 (JP) .................................. 2014-105625

(51) Int. Cl.
*H04W 72/04* (2009.01)
*H04W 74/08* (2009.01)
*H04W 4/00* (2009.01)
*H04W 24/06* (2009.01)
*H04B 7/26* (2006.01)

(52) U.S. Cl.
CPC ...... *H04W 72/0446* (2013.01); *H04B 7/2631* (2013.01); *H04W 4/005* (2013.01); *H04W 24/06* (2013.01); *H04W 72/0406* (2013.01); *H04W 74/0833* (2013.01)

(58) Field of Classification Search
CPC ............... H04B 7/2628; H04B 7/2631; H04W 72/0406; H04W 72/0446; H04W 24/06; H04W 74/0833; H04L 5/0053
See application file for complete search history.

(56) References Cited

U.S. PATENT DOCUMENTS

| | | | | |
|---|---|---|---|---|
| 2007/0140115 A1* | 6/2007 | Bienas | ................ | H04W 74/008 370/230 |
| 2008/0123585 A1* | 5/2008 | Granzow | ............ | H04W 72/044 370/320 |
| 2009/0323607 A1* | 12/2009 | Park | ..................... | H04B 7/2628 370/329 |

(Continued)

FOREIGN PATENT DOCUMENTS

| | | |
|---|---|---|
| JP | 2000-134144 A | 5/2000 |
| JP | 2002-165260 A | 6/2002 |
| JP | 2008-193261 A | 8/2008 |

*Primary Examiner* — Paul H Masur
(74) *Attorney, Agent, or Firm* — Arent Fox LLP

(57) ABSTRACT

A communication system including: a base station; and a terminal configured to: select a known signal from at least one first known signal included in a plurality of known signals that is divided into the at least one first known signal and at least one second known signal, each of the at least one first known signal indicating that the terminal transmits a following uplink signal including a specific data, each of the at least one second known signal indicating that the terminal transmits the following uplink signal not including the specific data, the following uplink signal being transmitted from the terminal to the base station in association with the selected known signal, and transmit the selected known signal to the base station.

16 Claims, 12 Drawing Sheets

(56) References Cited

U.S. PATENT DOCUMENTS

| | | | |
|---|---|---|---|
| 2010/0014468 A1* | 1/2010 | Lee | H04W 74/006 370/329 |
| 2010/0029298 A1 | 2/2010 | Iwamura et al. | |
| 2010/0046384 A1* | 2/2010 | Lee | H04W 52/325 370/252 |
| 2010/0067495 A1* | 3/2010 | Lee | H04W 74/008 370/335 |
| 2010/0067498 A1* | 3/2010 | Lee | H04W 74/006 370/336 |
| 2010/0290408 A1* | 11/2010 | Steudle | H04W 52/50 370/329 |
| 2012/0250659 A1* | 10/2012 | Sambhwani | H04W 74/002 370/332 |
| 2015/0173105 A1* | 6/2015 | Bergstrom | H04W 74/006 370/329 |

* cited by examiner

FIG. 3

| PREAMBLE SIGNATURE | VALUE OF n | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$ | 1 | 1 | 1 | 1 | 1 | 1 | 1 | 1 | 1 | 1 | 1 | 1 | 1 | 1 | 1 | 1 |
| $P_1(n)$ | 1 | -1 | -1 | -1 | 1 | -1 | 1 | -1 | 1 | -1 | 1 | -1 | 1 | -1 | 1 | -1 |
| $P_2(n)$ | 1 | 1 | -1 | -1 | 1 | 1 | -1 | -1 | 1 | 1 | -1 | -1 | 1 | 1 | -1 | -1 |
| $P_3(n)$ | 1 | 1 | 1 | -1 | -1 | -1 | -1 | -1 | 1 | -1 | 1 | 1 | -1 | -1 | -1 | 1 |
| $P_4(n)$ | 1 | 1 | 1 | 1 | -1 | 1 | 1 | 1 | 1 | -1 | 1 | -1 | -1 | -1 | -1 | -1 |
| $P_5(n)$ | 1 | -1 | -1 | -1 | 1 | 1 | 1 | -1 | -1 | -1 | -1 | 1 | -1 | 1 | 1 | 1 |
| $P_6(n)$ | 1 | 1 | -1 | -1 | 1 | 1 | -1 | 1 | -1 | -1 | -1 | 1 | -1 | -1 | 1 | -1 |
| $P_7(n)$ | 1 | -1 | 1 | -1 | -1 | -1 | -1 | 1 | -1 | -1 | 1 | 1 | -1 | 1 | 1 | -1 |
| $P_8(n)$ | 1 | 1 | 1 | 1 | -1 | 1 | 1 | 1 | -1 | -1 | -1 | -1 | -1 | 1 | 1 | 1 |
| $P_9(n)$ | 1 | -1 | 1 | 1 | -1 | -1 | 1 | -1 | -1 | 1 | -1 | 1 | -1 | 1 | 1 | 1 |
| $P_{10}(n)$ | 1 | 1 | -1 | 1 | -1 | -1 | -1 | 1 | -1 | -1 | 1 | 1 | 1 | 1 | 1 | -1 |
| $P_{11}(n)$ | 1 | -1 | 1 | -1 | -1 | -1 | -1 | 1 | -1 | 1 | -1 | -1 | -1 | -1 | 1 | 1 |
| $P_{12}(n)$ | 1 | 1 | 1 | 1 | -1 | -1 | 1 | 1 | -1 | -1 | -1 | 1 | 1 | -1 | -1 | -1 |
| $P_{13}(n)$ | 1 | -1 | -1 | -1 | -1 | -1 | -1 | 1 | -1 | 1 | 1 | 1 | 1 | 1 | 1 | 1 |
| $P_{14}(n)$ | 1 | 1 | -1 | 1 | -1 | 1 | 1 | 1 | -1 | 1 | -1 | -1 | 1 | 1 | -1 | -1 |
| $P_{15}(n)$ | 1 | -1 | -1 | 1 | -1 | -1 | 1 | -1 | -1 | 1 | 1 | -1 | 1 | -1 | -1 | 1 |

FOR FIXED TERMINAL / FOR MOBILE TERMINAL / FOR FIXED TERMINAL

FIG. 8

Columns 1–14: FOR MOBILE TERMINAL; Column 15: FOR FIXED TERMINAL

| PREAMBLE SIGNATURE | VALUE OF n | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$ | 1 | 1 | 1 | 1 | 1 | 1 | 1 | 1 | 1 | 1 | 1 | 1 | 1 | 1 | 1 | 1 |
| $P_1(n)$ | 1 | -1 | 1 | -1 | 1 | -1 | 1 | -1 | 1 | -1 | 1 | -1 | 1 | -1 | 1 | -1 |
| $P_2(n)$ | 1 | 1 | -1 | -1 | 1 | 1 | -1 | -1 | 1 | 1 | -1 | -1 | 1 | 1 | -1 | -1 |
| $P_3(n)$ | 1 | -1 | -1 | 1 | -1 | 1 | -1 | 1 | 1 | -1 | -1 | 1 | 1 | -1 | -1 | 1 |
| $P_4(n)$ | 1 | 1 | 1 | 1 | -1 | -1 | -1 | -1 | 1 | 1 | 1 | 1 | -1 | -1 | -1 | 1 |
| $P_5(n)$ | 1 | -1 | 1 | -1 | -1 | 1 | -1 | 1 | 1 | -1 | 1 | -1 | -1 | 1 | -1 | 1 |
| $P_6(n)$ | 1 | 1 | -1 | -1 | -1 | -1 | 1 | 1 | 1 | 1 | -1 | -1 | -1 | 1 | 1 | 1 |
| $P_7(n)$ | 1 | -1 | -1 | 1 | -1 | 1 | 1 | -1 | 1 | -1 | -1 | 1 | -1 | 1 | 1 | -1 |
| $P_8(n)$ | 1 | 1 | 1 | 1 | 1 | 1 | 1 | 1 | -1 | -1 | -1 | -1 | -1 | -1 | -1 | -1 |
| $P_9(n)$ | 1 | -1 | 1 | -1 | 1 | -1 | 1 | -1 | -1 | 1 | -1 | 1 | -1 | 1 | -1 | 1 |
| $P_{10}(n)$ | 1 | 1 | -1 | -1 | 1 | 1 | -1 | -1 | -1 | -1 | 1 | 1 | -1 | -1 | 1 | 1 |
| $P_{11}(n)$ | 1 | -1 | -1 | 1 | 1 | -1 | -1 | 1 | -1 | 1 | 1 | -1 | -1 | 1 | 1 | -1 |
| $P_{12}(n)$ | 1 | 1 | 1 | 1 | -1 | -1 | -1 | -1 | -1 | -1 | -1 | -1 | 1 | 1 | 1 | 1 |
| $P_{13}(n)$ | 1 | -1 | 1 | -1 | -1 | 1 | -1 | 1 | -1 | 1 | -1 | 1 | 1 | -1 | 1 | -1 |
| $P_{14}(n)$ | 1 | -1 | -1 | 1 | -1 | -1 | 1 | -1 | -1 | 1 | 1 | -1 | 1 | -1 | -1 | 1 |
| $P_{15}(n)$ | 1 | 1 | 1 | 1 | 1 | -1 | -1 | -1 | -1 | 1 | 1 | -1 | -1 | -1 | -1 | 1 |
| $P_{16}(n)$ | 1 | -1 | 1 | 1 | -1 | 1 | -1 | -1 | 1 | 1 | 1 | 1 | -1 | -1 | -1 | -1 |

COMMUNICATION SYSTEM, TERMINAL, AND BASE STATION

CROSS-REFERENCE TO RELATED APPLICATION

This application is based upon and claims the benefit of priority of the prior Japanese Patent Application No. 2014-105625, filed on May 21, 2014, the entire contents of which are incorporated herein by reference.

FIELD

The embodiments discussed herein are related to a communication system, a terminal, and a base station.

BACKGROUND

In a communication system including a base station and a terminal device (hereinafter, also referred to as "terminal"), a machine type communication (MTC) terminal has attracted attention as a new terminal, in recent years. Examples of the MTC terminal include a smart meter which is a power meter having a wireless communication function, and a vending machine having a wireless communication function. The smart meter having a wireless communication function transmits, for example, the data of the measured power usage to a base station. Further, the vending machine having a wireless communication function transmits, for example, sales information, inventory information of the vending machine, and the like to the base station.

Additionally introducing an MTC terminal into a communication system including general terminals such as mobile phones, smart phones, and tablet terminals has been studied.

Examples of related art include Japanese Laid-open Patent Publication No. 2008-193261, Japanese Laid-open Patent Publication No. 2000-134144, and Japanese Laid-open Patent Publication No. 2002-165260.

SUMMARY

According to an aspect of the invention, a communication system includes a base station; and a terminal configured to: select a known signal from at least one first known signal included in a plurality of known signals that is divided into the at least one first known signal and at least one second known signal, each of the at least one first known signal indicating that the terminal transmits a following uplink signal including a specific data, each of the at least one second known signal indicating that the terminal transmits the following uplink signal not including the specific data, the following uplink signal being transmitted from the terminal to the base station in association with the selected known signal, and transmit the selected known signal to the base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a preamble signature of Embodiment 1;

FIG. 8 is a diagram illustrating an example of a preamble signature of Embodiment 1;

DESCRIPTION OF EMBODIMENTS

Figure 1:
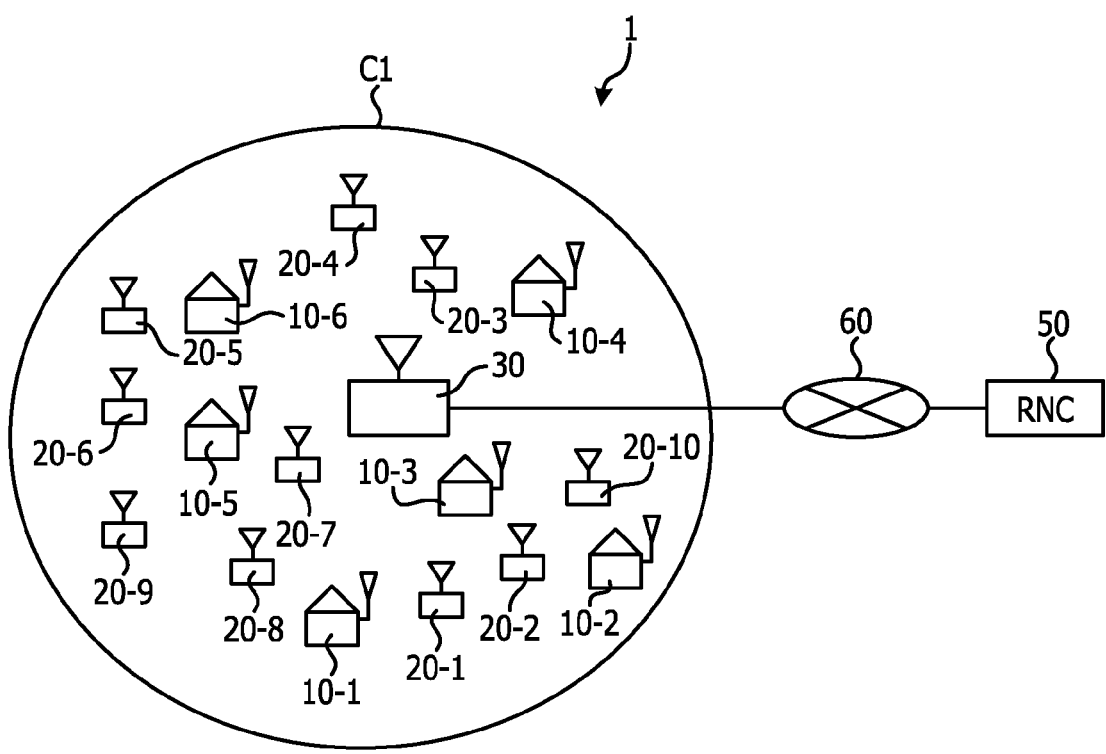
FIG. 1 is a diagram illustrating an example of a configuration of a communication system of Embodiment 1.

In recent years, with increasing use of smartphones and tablet terminals which are capable of transmitting and receiving various types and large amounts of data, communication traffic in a communication system rapidly increases. Under these circumstances, if an MTC terminal is additionally introduced into the communication system, the communication traffic further increases, and thus congestion in the communication traffic is expected to occur. For example, since the introduction of as many as several tens of millions of smart meters into the entirety of Japan is scheduled in the future, if power usage is reported from a plurality of smart meters in addition to the transmission of data from general terminals, congestion in the communication traffic in a wireless line is expected to occur.

A technology has been disclosed in view of the above circumstances, and an object thereof is to avoid the congestion of communication traffic.

Hereinafter, embodiments of a communication system, a fixed terminal, and a base station disclosed herein will be described with reference to the drawings. In addition, the communication system, the fixed terminal, and the base station disclosed herein are not limited to the embodiments. Further, configurations having the same function and steps of performing the same process are denoted by the same reference numerals in respective embodiments, and thus redundant description is omitted.

Embodiment 1

Configuration of Communication System

FIG. 1 is a diagram illustrating an example of a configuration of a communication system of Embodiment 1. The communication system 1 illustrated in FIG. 1 includes fixed terminals 10-1 to 10-6, mobile terminals 20-1 to 20-10, a base station 30, and a radio network controller (RNC) 50. The base station 30 and the RNC 50 are connected through a network 60, and the RNC 50 corresponds to a higher node of the base station 30. The base station 30 forms a cell C1 which is a communication area, and the fixed terminals 10-1 to 10-6 and the mobile terminals 20-1 to 20-10 which are located in the cell C1 wirelessly communicate with each other. Hereinafter, when the fixed terminals 10-1 to 10-6 do not have to be distinguished one another, they are collectively referred to as a fixed terminal 10, and when the mobile terminals 20-1 to 20-10 do not have to be distinguished one another, they are also collectively referred to as a mobile terminal 20. Further, FIG. 1 illustrates an example where there are six fixed terminals and ten mobile terminals, but the number of terminals communicating with the base station 30 is not limited.

Here, the "mobile terminal" is, for example, a general terminal such as a mobile phone, a smartphone, and a tablet terminal, and refers to a movable terminal. Meanwhile, the "fixed terminal" is a terminal such as a smart meter that does not move, and corresponds to an MTC terminal. In other words, the "fixed terminal" is a "non-mobile terminal". The fixed terminal 10 and the mobile terminal 20 are mixed in the cell C1, and communicate with the base station 30 in accordance with the same communication scheme. The same communication scheme is, for example, a wideband code division multiple access (W-CDMA) scheme.

Processing Sequence of Communication System

Figure 2:
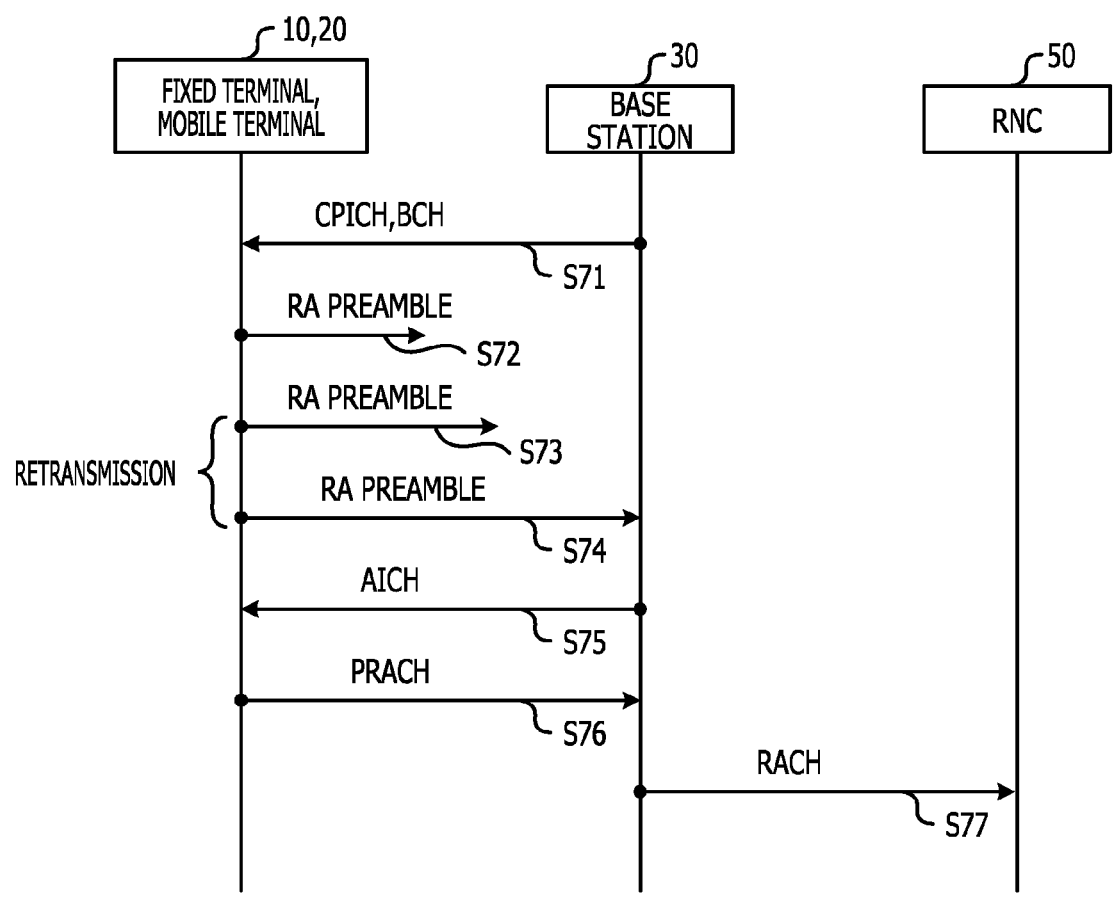
FIG. 2 is a diagram illustrating an example of a processing sequence of the communication system of Embodiment 1.

FIG. 2 is a diagram illustrating an example of a processing sequence of the communication system of Embodiment 1.

The processes of steps S72 to S76 are a series of processes in a single connection request procedure. Further, the connection request procedure including a series of processes of steps S72 to S76 is performed, for example, during the location registration of the terminal to the base station 30, prior to configuration of a dedicated channel (namely for starting dedicated communications between the terminal and the base station 30).

The base station 30 transmits a common pilot channel (CPICH) signal and a broadcast control channel (BCH) signal to all terminals in the cell C1, and the fixed terminal 10 and the mobile terminal 20 receive the CPICH signal and the BCH signal (step S71).

Here, the BCH signal includes information indicating whether a preamble signature is a preamble signature for the mobile terminal or a preamble signature for the fixed terminal (hereinafter, referred to as "signature information"), among a plurality of preamble signatures defined by a predetermined communication scheme. For example, in the W-CDMA system, as illustrated in FIG. 3, preamble signatures of 16 sequences of $P_0(n)$ to $P_{15}(n)$ are defined. The respective preamble signatures of $P_0(n)$ to $P_{15}(n)$ are configured with 16 codes of "1" or "−1". 16 sequences of the preamble signatures $P_0(n)$ to $P_{15}(n)$ are known to the fixed terminal 10, the mobile terminal 20, and the base station 30 (namely, the preamble signatures of $P0(n)$ to $P15(n)$ are known signals).

In Embodiment 1, among the preamble signatures $P_0(n)$ to $P_{15}(n)$, some preamble signatures are configured for a mobile terminal, and some preamble signatures other than the preamble signatures for the mobile terminal are configured for a fixed terminal. For example, as illustrated in FIG. 3, among the $P_0(n)$ to $P_{15}(n)$ which are defined in the W-CDMA system, $P_2(n)$ to $P_8(n)$ are configured for the mobile terminal, and $P_0(n)$, $P_1(n)$, and $P_9(n)$ to $P_{15}(n)$ are configured for the fixed terminal. In this case, the BCH signal includes signature information indicating that $P_2(n)$ to $P_8(n)$ are configured for the mobile terminal, and $P_0(n)$, $P_1(n)$, and $P_9(n)$ to $P_{15}(n)$ are configured for the fixed terminal. In other words, the base station 30 notifies the fixed terminal 10 and the mobile terminal 20 of the preamble signatures for the fixed terminal and the preamble signatures for the mobile terminal, by using the BCH signal.

In addition, here, it is assumed that the preamble signatures of all of $P_0(n)$ to $P_{15}(n)$ may be used in the communication system 1. In other words, it is assumed that the preamble signatures of all of $P_0(n)$ to $P_{15}(n)$ are valid in the communication system 1. However, among $P_0(n)$ to $P_{15}(n)$, only a plurality of specific preamble signatures may be valid. Here, the valid preamble signatures include both of the preamble signatures for a fixed terminal and the preamble signatures for a mobile terminal.

The fixed terminal 10 that receives the BCH signal determines that $P_0(n)$, $P_1(n)$, and $P_9(n)$ to $P_{15}(n)$, among $P_0(n)$ to $P_{15}(n)$, are the preamble signatures for the fixed terminal, based on the signature information. Then, the fixed terminal 10 randomly selects any one preamble signature among $P_0(n)$, $P_1(n)$, and $P_9(n)$ to $P_{15}(n)$, and transmits a random access (RA) preamble including the selected preamble signature to the base station 30 (step S72). When the fixed terminal 10 does not receive an acquisition indication channel (AICH) signal from the base station 30 within a predetermined time after transmitting the RA preamble, the fixed terminal 10 retransmits the RA preamble while further increasing the power of the RA preamble than in the previous transmission (steps S73 and S74). The retransmission is repeated until the fixed terminal 10 receives the AICH signal from the base station 30.

Meanwhile, the mobile terminal 20 that receives the BCH signal determines that $P_2(n)$ to $P_8(n)$, among $P_0(n)$ to $P_{15}(n)$, are the preamble signatures for the mobile terminal, based on the signature information. Then, the mobile terminal 20 randomly selects any one preamble signature among $P_2(n)$ to $P_8(n)$, and transmits an RA preamble including the selected preamble signature to the base station 30 (step S72). When the mobile terminal 20 does not receive an AICH signal from the base station 30 within a predetermined time after transmitting the RA preamble, the mobile terminal 20 retransmits the RA preamble while further increasing the power of the RA preamble than in the previous transmission (steps S73 and S74). The retransmission is repeated until the mobile terminal 20 receives the AICH signal from the base station 30.

The base station 30 that receives the RA preamble including any one preamble signature among $P_0(n)$ to $P_{15}(n)$ from the fixed terminal 10 or the mobile terminal 20 performs correlation calculation between the received RA preamble and respective preamble signatures of $P_0(n)$ to $P_{15}(n)$, and specifies the preamble signature at which the correlation level is equal to or greater than a threshold. The preamble signature at which the correlation level is equal to or greater than the threshold is the preamble signature received by the base station 30. Then, the base station 30 determines whether the received preamble signature is for the fixed terminal or the mobile terminal. In other words, when the received preamble signature is any of $P_0(n)$, $P_1(n)$, $P_9(n)$ to $P_{15}(n)$, the base station 30 determines that the source of the received preamble signature is the fixed terminal 10. Meanwhile, when the received preamble signature is any of $P_2(n)$ to $P_8(n)$, the base station 30 determines that the source of the received preamble signature is the mobile terminal 20. Hereinafter, since the processing sequence for the mobile terminal 20 is the same as the general sequence, the description thereof will be omitted.

When the received preamble signature is one for the fixed terminal, the base station 30 transmits the AICH signal corresponding to the received preamble signature to the fixed terminal 10 (step S75). The signal patterns of the AICH signals are different from each other between the preamble signatures of $P_0(n)$ to $P_{15}(n)$, and the signal patterns are a fixed pattern corresponding to the preamble signature received by the base station 30. Therefore, the fixed terminal 10 receives the AICH signal of the fixed pattern corresponding to the preamble signature that is transmitted by the fixed terminal 10.

The fixed terminal 10 that receives the AICH signal of the fixed pattern corresponding to the preamble signature that is transmitted by the fixed terminal 10 forms a physical random access channel (PRACH) signal including the specific information of the fixed terminal. Then, the fixed terminal 10 transmits the formed PRACH signal to the base station 30, and the base station 30 receives the PRACH signal (step S76). The PRACH is an uplink common channel.

Figure 4:
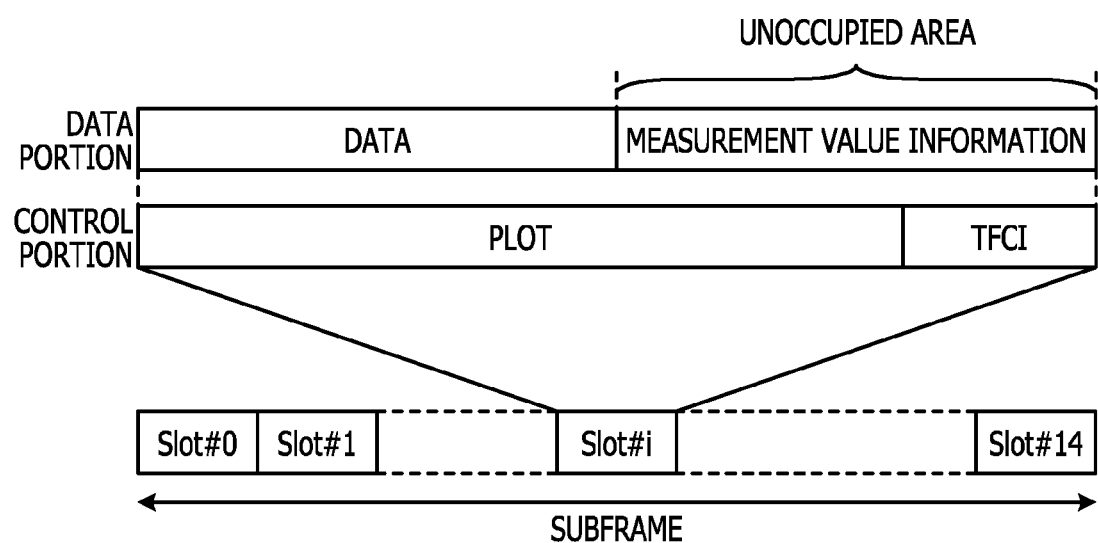
FIG. 4 is a diagram illustrating an example of a PRACH signal of Embodiment 1.

Here, FIG. 4 illustrates an example of the PRACH signal. A single subframe of the PRACH signal is configured with 15 slots. Further, in each slot, a control portion and a data portion are IQ multiplexed. The control portion is configured with a pilot and a transport format combination indicator (TFCI). Meanwhile, the data in the data portion includes a terminal ID for uniquely identifying each fixed terminal 10. Further, since the data portion has an unoccupied area (or spare area), the fixed terminal 10 stores the information regarding the values measured by the fixed terminal 10, in the unoccupied area. If the fixed terminal 10 is a smart meter, the measurement value information is, for example, the power usage. In other words, the fixed terminal 10 forms the uplink common channel signal including, for example, the terminal ID and the measurement value information, as the specific information of the fixed terminal.

The interval between a transmission timing of the AICH signal that is transmitted to a certain terminal in the base station 30 and a reception timing of the PRACH signal transmitted from the certain terminal in accordance with the AICH signal in the base station 30 is previously defined as a predetermined value. Further, as described above, the signal patterns of the AICH signals are different from each other between the preamble signatures and the signal patterns are fixed patterns corresponding to the preamble signature received by the base station 30. Thus, the preamble signature and the PRACH signal may be associated through the AICH signal. In addition, as described above, the preamble signature for the fixed terminal and the preamble signature for the mobile terminal are different from each other. Therefore, the base station 30 may determine whether the source of the received PRACH signal is the fixed terminal 10 or the mobile terminal 20, based on the transmission timing of the AICH signal and the reception timing of the PRACH signal. Thus, when the preamble signature for the fixed terminal is received, the base station 30 extracts (or derives) the specific information of the fixed terminal (for example, the terminal ID and the measurement value information) from the PRACH signal corresponding to the preamble signature for the fixed terminal. In other words, when the received PRACH signal corresponds to the preamble signature for the fixed terminal, in other words, when the received PRACH signal is transmitted from the fixed terminal 10, the base station 30 extracts the specific information of the fixed terminal from the PRACH signal.

Next, the base station 30 temporarily stores the extracted specific information of the fixed terminal in the buffer, and transmits a random access channel (RACH) signal including the specific information of the fixed terminal to the RNC 50 at an appropriate transmission timing (step S77). For example, the base station 30 temporarily stores the terminal ID and measurement value information in association with each other, in the buffer. Further, the appropriate timing is, for example, a timing at which the traffic amount of the network 60, that is, the load of the network 60 is less than a threshold.

Figure 5:
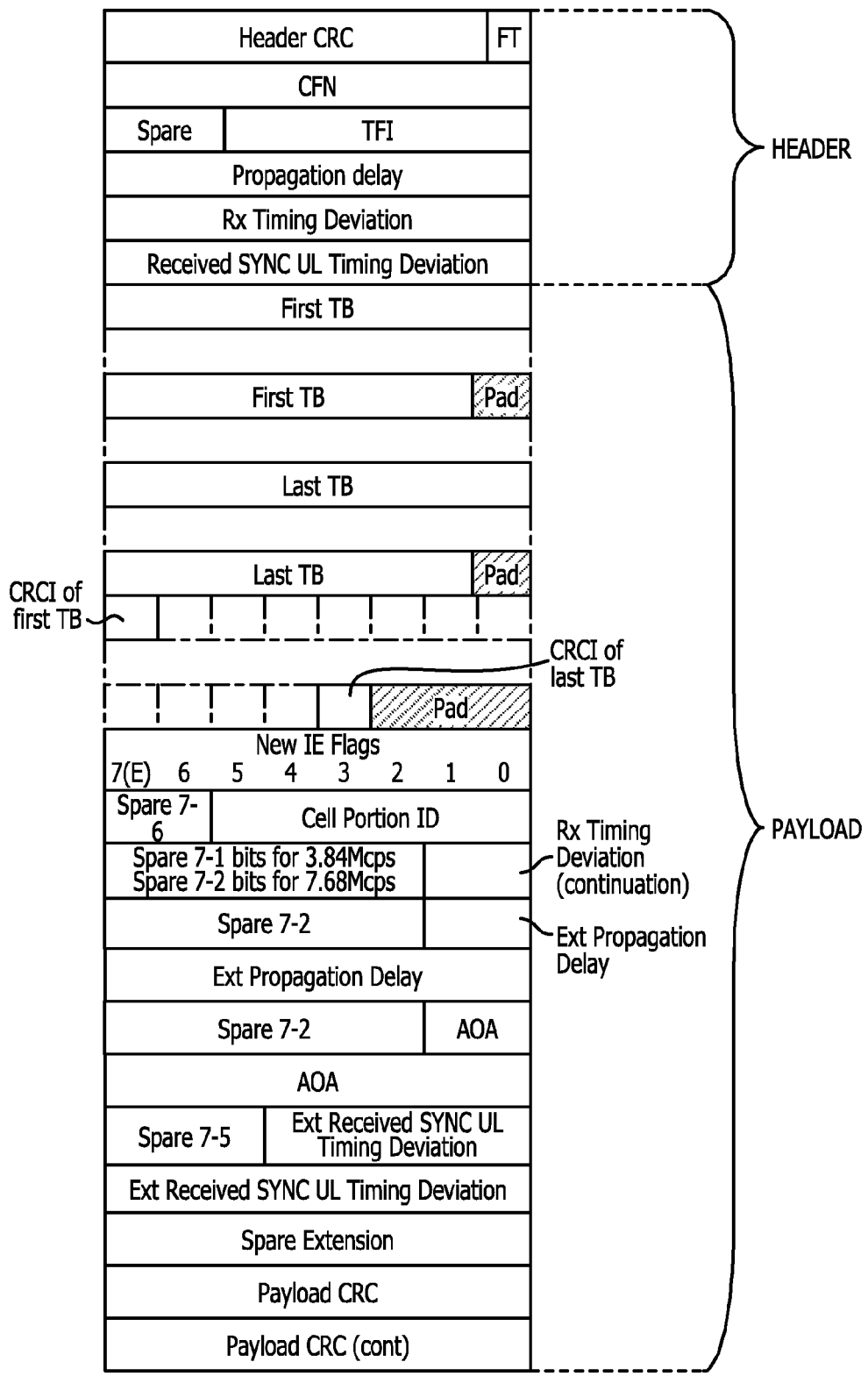
FIG. 5 is a diagram illustrating an example of a RACH signal of Embodiment 1.

FIG. 5 illustrates an example of an RACH signal. The RACH signal has a header and a payload. In the payload portion, there is an unoccupied area which is a padding area (Pad). Thus, the base station 30 forms the RACH signal in which the specific information of the fixed terminal is stored in the padding area, and outputs the RACH signal to the RNC 50.

Configuration of Fixed Terminal

Figure 6:
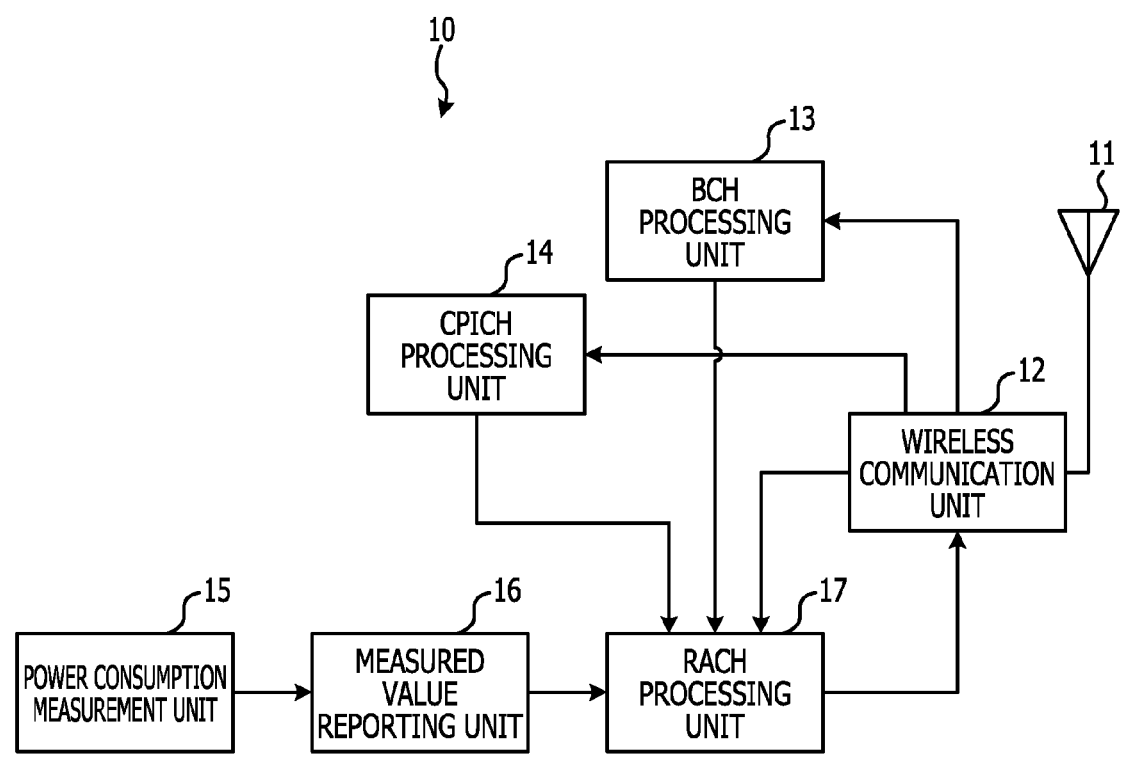
FIG. 6 is a functional block diagram illustrating an example of a fixed terminal of Embodiment 1.

FIG. 6 is a functional block diagram illustrating an example of a fixed terminal of Embodiment 1. The fixed terminal 10 illustrated in FIG. 6 is, for example, a smart meter. The fixed terminal 10 includes an antenna 11, a wireless communication unit 12, a BCH processing unit 13, a CPICH processing unit 14, a power consumption measurement unit 15, a measured value reporting unit 16, and an RACH processing unit 17.

The wireless communication unit 12 receives a BCH signal, a CPICH signal, and an AICH signal from the base station 30 through the antenna 11, and outputs the BCH signal, the CPICH signal, and the AICH signal to the BCH processing unit 13, the CPICH processing unit 14, and the RACH processing unit 17, respectively. Further, the wireless communication unit 12 transmits the RA preamble and the PRACH signal which are input from the RACH processing unit 17 to the base station 30 through the antenna 11. When the wireless communication unit 12 does not receive the AICH signal from the base station 30 within a predetermined time after transmitting the RA preamble, the wireless communication unit 12 retransmits the RA preamble while further increasing the power of the RA preamble than in the previous transmission. The retransmission is repeated until the wireless communication unit 12 receives the AICH signal from the base station 30.

The BCH processing unit 13 extracts the signature information from the BCH signal, and outputs the extracted signature information to the RACH processing unit 17.

The CPICH processing unit 14 detects a scrambling code for scrambling the CPICH signal, and outputs the detection result to the RACH processing unit 17.

The RACH processing unit 17 stores the preamble signatures $P_0(n)$ to $P_{15}(n)$. The RACH processing unit 17 determines that $P_0(n)$, $P_1(n)$, and $P_9(n)$ to $P_{15}(n)$, among $P_0(n)$ to $P_{15}(n)$, are the preamble signatures for the fixed terminal, based on the signature information. Then, the RACH processing unit 17 randomly selects any one preamble signature among $P_0(n)$, $P_1(n)$, and $P_9(n)$ to $P_{15}(n)$, forms an RA preamble including the selected preamble signature, and outputs the RA preamble to the wireless communication unit 12.

Further, if the AICH signal of a fixed pattern corresponding to the preamble signature included in the formed RA preamble is input from the wireless communication unit 12, the RACH processing unit 17 forms the PRACH signal including specific information of the fixed terminal and outputs the PRACH signal to the wireless communication unit 12. The specific information of the fixed terminal is, for example, the terminal ID of the fixed terminal 10, and the power usage in the building at which the fixed terminal 10 is installed. The terminal ID and the power usage are input from the measured value reporting unit 16 to the RACH processing unit 17.

Further, the RACH processing unit 17 controls a timing for outputting an initial RA preamble to the wireless communication unit 12, that is, a transmission start timing of the RA preamble, based on the detection result input from the CPICH processing unit 14.

The power consumption measurement unit 15 continuously measures the power usage in the building in which the fixed terminal 10 is installed, and outputs the measurement result to the measured value reporting unit 16.

The measured value reporting unit 16 stores the terminal ID, and outputs the terminal ID, and the power usage which is the measurement result, to the RACH processing unit 17, at a predetermined interval. The predetermined interval is, for example, 30 minutes, and the measured value reporting unit 16 outputs the terminal ID and the power usage to the RACH processing unit 17, for example, at every 30 minutes. Thus, the measurement value information is reported to the base station 30 at a predetermined interval.

Configuration of Base Station

Figure 7:
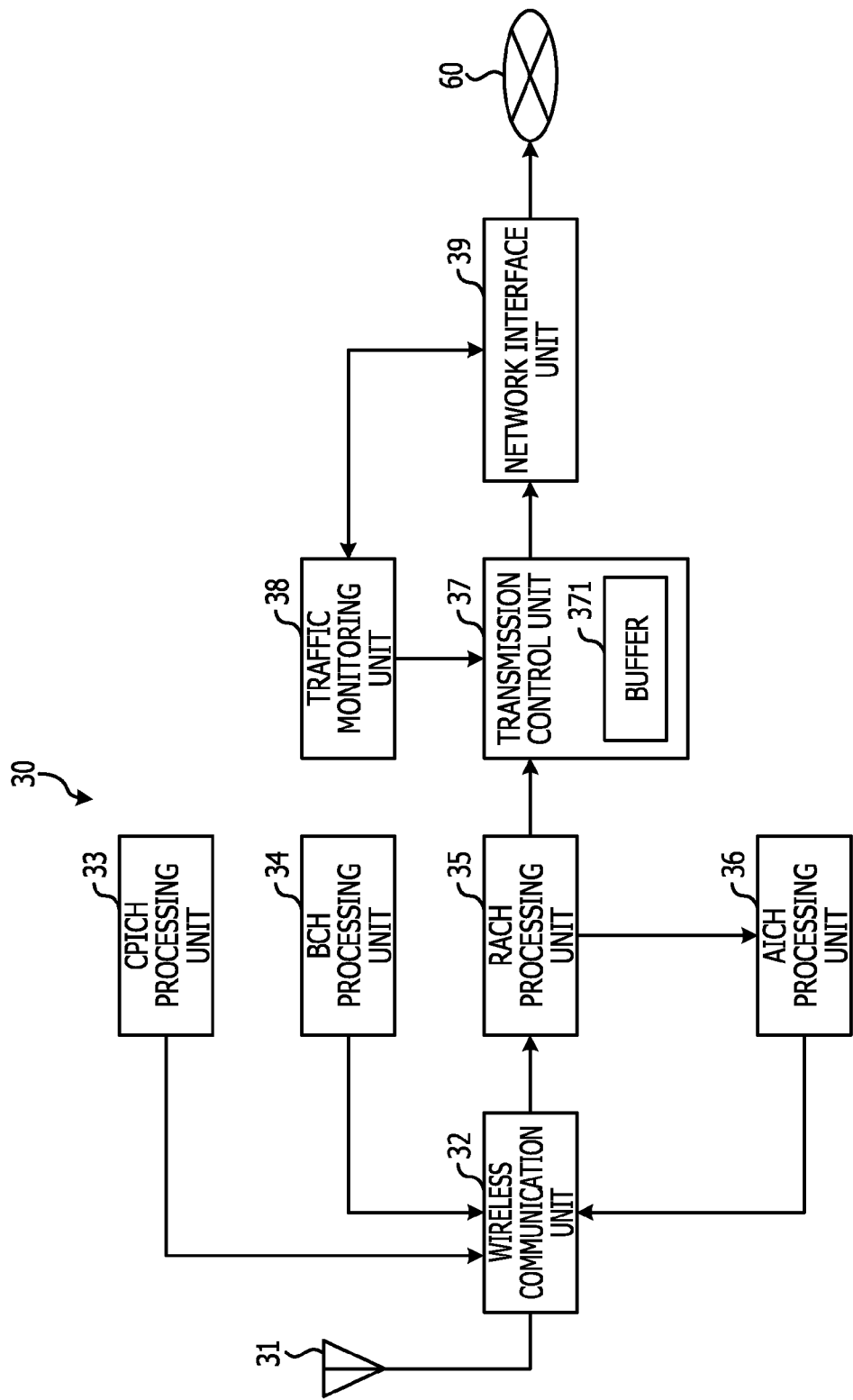
FIG. 7 is a functional block diagram illustrating an example of a base station of Embodiment 1.

FIG. 7 is a functional block diagram illustrating an example of a base station of Embodiment 1. The base station 30 illustrated in FIG. 7 includes an antenna 31, a wireless communication unit 32, a CPICH processing unit 33, a BCH processing unit 34, an RACH processing unit 35, an AICH processing unit 36, a transmission control unit 37, a traffic monitoring unit 38, and a network interface unit 39. The transmission control unit 37 includes a buffer 371.

The wireless communication unit 32 receives the RA preamble and the PRACH signal from the fixed terminal 10 or the mobile terminal 20 through the antenna 31, and outputs the RA preamble and the PRACH signal to the RACH processing unit 35. Further, the wireless communication unit 32 transmits the CPICH signal which is input from the CPICH processing unit 33, the BCH signal which is input from the BCH processing unit 34, and the AICH signal which is input from the AICH processing unit 36, to the fixed terminal 10 or mobile terminal 20, through the antenna 31.

The CPICH processing unit 33 forms the CPICH signal that is scrambled with a scrambling code for identifying a cell C1 or a sector formed by the base station 30, and outputs the formed CPICH signal to the wireless communication unit 32.

The BCH processing unit 34 forms a BCH signal including the signature information, and outputs the formed BCH signal to the wireless communication unit 32.

The RACH processing unit 35 stores the preamble signatures $P_0(n)$ to $P_{15}(n)$. The RACH processing unit 35 performs correlation calculation between the RA preamble input from the wireless communication unit 32 and respective preamble signatures of $P_0(n)$ to $P_{15}(n)$, and specifies the preamble signature at which the correlation level is equal to or greater than a threshold. The preamble signature at which the correlation level is equal to or greater than the threshold is the preamble signature which is received by the wireless communication unit 32. Then, the RACH processing unit 35 determines whether the specified preamble signature is for the fixed terminal or the mobile terminal, stores the determination result and the specified preamble signature, and outputs the specified preamble signature to the AICH processing unit 36.

Further, the transmission timing of the AICH signal is input to the RACH processing unit 35 from the wireless communication unit 32. The RACH processing unit 35 determines whether the source of the received PRACH signal is the fixed terminal 10 or the mobile terminal 20, based on the transmission timing of the AICH signal and the reception timing of the PRACH signal. Then, when the preamble signature for the fixed terminal is received, the RACH processing unit 35 extracts the specific information of the fixed terminal from the PRACH signal corresponding to the preamble signature for a fixed terminal, and outputs the extracted information to the transmission control unit 37. Meanwhile, when the preamble signature for the mobile terminal is received, the RACH processing unit 35 extracts predetermined information of the mobile terminal from the PRACH signal corresponding to the preamble signature for the mobile terminal, and outputs the extracted information to the measurement value information control unit 37.

The AICH processing unit 36 forms the AICH signal of a fixed pattern corresponding to the preamble signature that is specified by the RACH processing unit 35, and outputs the formed AICH signal to the wireless communication unit 32.

When the specific information of the fixed terminal is input from the RACH processing unit 35, the transmission control unit 37 temporarily stores the specific information in the buffer 371. Then, when the traffic amount of the network 60 is less than the threshold, the transmission control unit 37 extracts the specific information of the fixed terminal from the buffer 371, forms an RACH signal including the specific information, and outputs the RACH signal to the network interface unit 39. Meanwhile, when predetermined information of the mobile terminal is input from the RACH processing unit 35, the transmission control unit 37 forms the RACH signal including the predetermined information and outputs the RACH signal to the network interface unit 39, without storing the predetermined information in the buffer 371.

The network interface unit 39 transmits the RACH signal input from the transmission control unit 37 to the RNC 50 through the network 60. In other words, the transmission control unit 37 controls a timing at which the specific information of the fixed terminal is transmitted to the RNC 50.

The traffic monitoring unit 38 monitors the traffic amount of the network 60 according to a predetermined communication protocol through the network interface unit 39, and outputs a monitoring result to the transmission control unit 37.

In addition, in FIG. 3, a case of setting some of $P_0(n)$ to $P_{15}(n)$ which are existing preamble signatures as those for the fixed terminal will be described. However, as illustrated in FIG. 8, a new preamble signature $P_{16}(n)$ may be provided as one for the fixed terminal, in addition to $P_0(n)$ to $P_{15}(n)$ which are existing preamble signatures.

As described above, according to Embodiment 1, the communication system 1 includes the fixed terminal 10, the mobile terminal 20, and the base station 30. The fixed terminal 10 transmits the preamble signature for the fixed terminal, among a plurality of the preamble signatures including the preamble signature for the mobile terminal and the preamble signature for the fixed terminal, to the base station 30. Further, the fixed terminal 10 transmits the PRACH signal including the specific information of the fixed terminal to the base station. The base station 30 receives any preamble signature among the plurality of preamble signatures. Further, the base station 30 receives the PRACH signal. Then, when the received preamble signature is the preamble signature for the fixed terminal, the base station 30 extracts the specific information of the fixed terminal from the PRACH signal corresponding to the preamble signature for the fixed terminal. The preamble signature for the fixed terminal and the PRACH signal is transmitted and received in a single connection request procedure.

Further, the fixed terminal 10 includes the RACH processing unit 17, and the wireless communication unit 12. The RACH processing unit 17 selects the preamble signature for the fixed terminal from the plurality of the preamble signatures including the preamble signature for the mobile terminal and the preamble signature for the fixed terminal. Further, the RACH processing unit 17 forms a PRACH signal including the specific information of the fixed terminal. The wireless communication unit 12 transmits the preamble signature for the fixed terminal selected by the RACH processing unit 17 to the base station 30. Further, the wireless communication unit 12 transmits the PRACH signal formed by the RACH processing unit 17 to the base station 30. The preamble signature for the fixed terminal and the PRACH signal are transmitted in a single connection request procedure.

Further, the base station 30 includes the wireless communication unit 32 and the RACH processing unit 35. The wireless communication unit 32 receives any preamble signature among the plurality of the preamble signatures including the preamble signature for the mobile terminal and the preamble signature for the fixed terminal. Further, the wireless communication unit 32 receives the PRACH signal including the specific information of the fixed terminal. When the received preamble signature is the preamble signature for the fixed terminal, the RACH processing unit 35 extracts the specific information of the fixed terminal from the PRACH signal corresponding to the preamble signature for the fixed terminal. The preamble signature for the fixed terminal and the PRACH signal are received in a single connection request procedure.

In this manner, the fixed terminal 10 may report a fact that the fixed terminal 10 is the fixed terminal to the base station 30, by using the RA preamble, and may report the specific information of the fixed terminal such as the power usage to the base station 30, by using the PRACH signal. In other words, the fixed terminal 10 may report a fact that the fixed terminal 10 is the fixed terminal, and the specific information of the fixed terminal to the base station 30, by using the RA preamble and the PRACH signal which are used when communication between the mobile terminal 20 and the base station 30 are started. Thus, the fixed terminal 10 may report the specific information of the fixed terminal to the base station 30, prior to configuration of a dedicated channel. Thus, the fixed terminal 10 may report the specific information of the fixed terminal to the base station 30, even without configuring a new dedicated channel for the fixed terminal between the fixed terminal 10 and the base station 30. Thus, according to Embodiment 1, since a new communication resource such as the dedicated channel for the fixed terminal 10 may not be prepared (or allocated), it is possible to suppress an increase in traffic amount at the wireless line. Therefore, it is possible to avoid congestion of communication traffic in the wireless line caused by the additional introduction of the fixed terminal 10 into the general communication system.

Further, according to Embodiment 1, the base station 30 includes a buffer 371 and the network interface unit 39. The buffer 371 temporarily stores specific information of the fixed terminal which is extracted by the RACH processing unit 35. The network interface unit 39 transmits the specific information of the fixed terminal which is temporarily stored in the buffer 371 to the RNC 50 through the network 60, at a transmission timing according to the traffic amount of the network 60.

Thus, when the traffic amount of the network 60 is less than a threshold, the base station 30 may transmit the specific information of the fixed terminal. Therefore, it is possible to avoid congestion of communication traffic in the network 60 caused by the additional introduction of the fixed terminal 10 into the general communication system.

In other words, according to Embodiment 1, it is possible to avoid congestion of communication traffic.

Embodiment 2

Configuration of Base Station

The configuration of a base station of Embodiment 2 is obtained by removing the traffic monitoring unit 38 from FIG. 7, and in Embodiment 2, the transmission timing of the specific information of the fixed terminal to the RNC 50 is different from that in Embodiment 1.

In other words, a plurality of other base stations having the same configuration as that of the base station 30 are connected to the network 60. Thus, the transmission control unit 37 extracts the specific information of the fixed terminal from the buffer 371 at a timing different from the transmission timing of the specific information of the fixed terminal in other base stations, and forms the RACH signal including the specific information. Then, the transmission control unit 37 outputs the formed RACH signal to the network interface unit 39. Thus, the network interface unit 39 transmits the specific information of the fixed terminal stored in the buffer 371 at a transmission timing different from the transmission timing of other base stations to the RNC 50.

By doing so, since the transmission timings of the specific information of the fixed terminal are distributed among a plurality of base stations, it is possible to avoid congestion of communication traffic in the network 60 caused by the additional introduction of the fixed terminal 10 into the general communication system.

Embodiment 3

Figure 9:
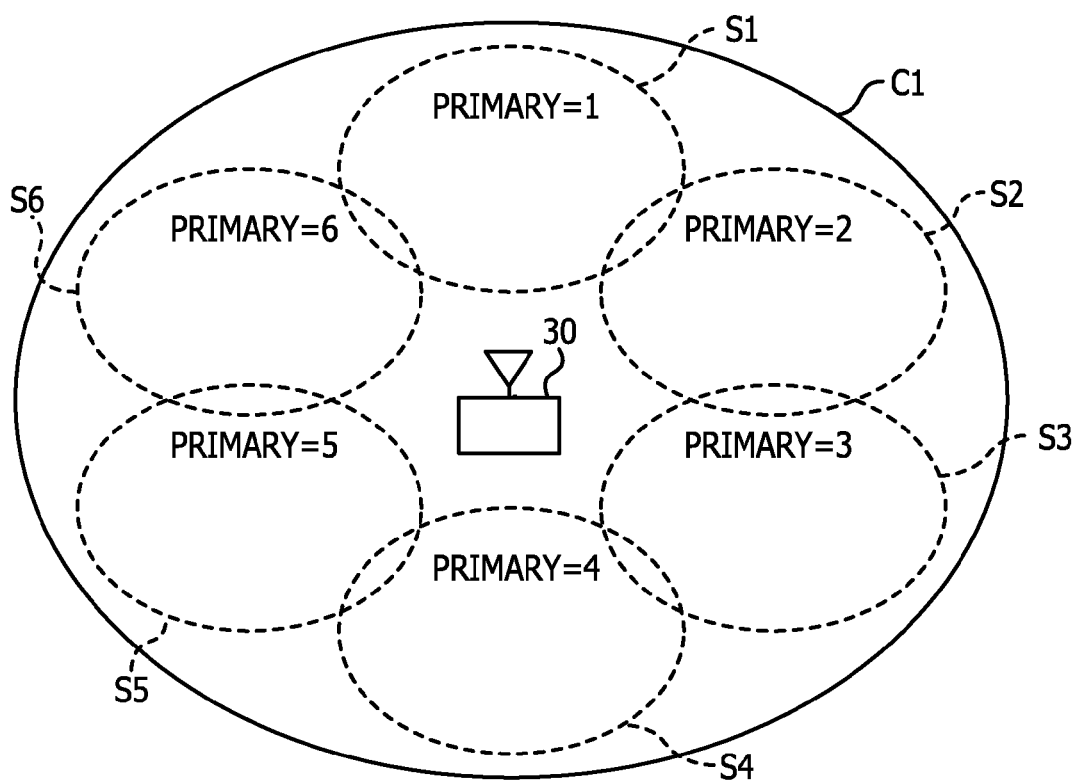
FIG. 9 is a diagram illustrating an operation of a fixed terminal of Embodiment 3.
Figure 10:
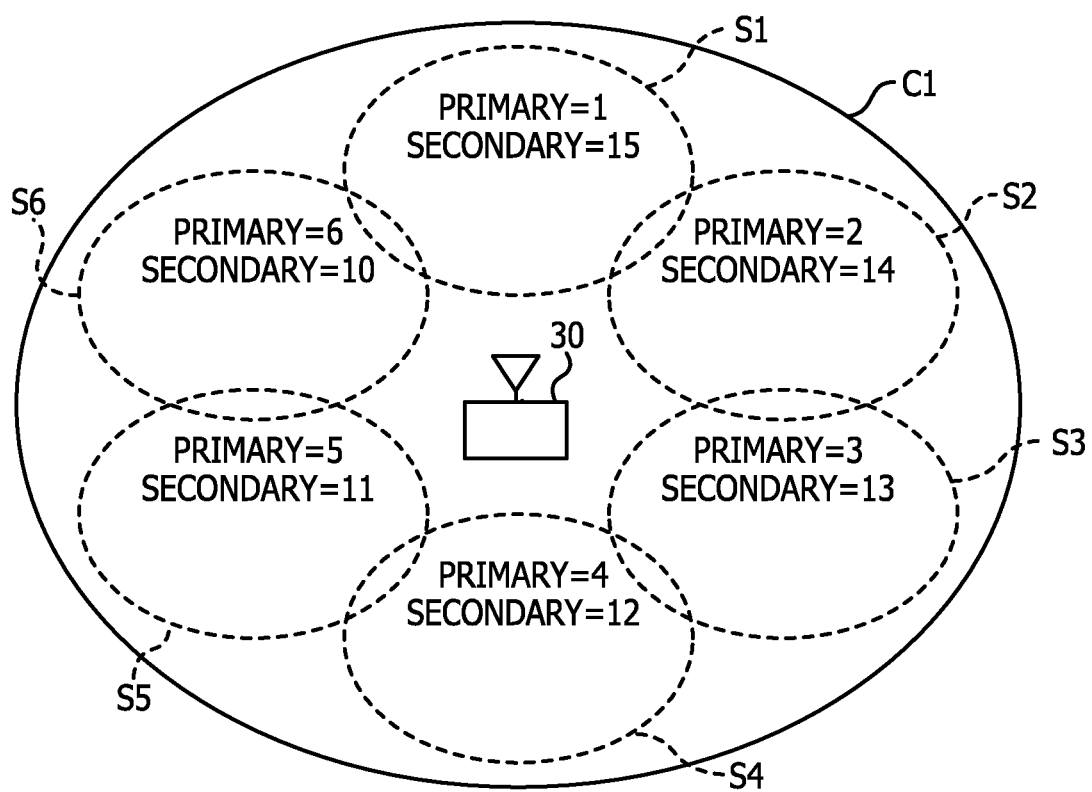
FIG. 10 is a diagram illustrating an operation of the fixed terminal of Embodiment 3.

One cell which is a large communication area may be divided into a plurality of sectors which are small communication areas. For example, as illustrated in FIG. 9 and FIG. 10, a cell C1 may be divided into six sectors of sectors S1 to S6. Further, a scrambling code is assigned to each sector, and a terminal may identify a sector in which the terminal is located, by specifying a scrambling code scrambling the received CPICH signal. The CPICH processing unit 33 of the base station 30 scrambles the CPICH signal for each sector with a scrambling code assigned to each sector. For example, 512 primary scrambling codes of numbers 1 to 512 (hereinafter, referred to as "P code") and 16 secondary scrambling codes of numbers 1 to 16 (hereinafter, referred to as "S code") are defined as a scrambling code which is usable in the W-CDMA system. Thus, in a case of using only the P code, respective 512 sectors may be identified, and in a case of using the P code and the S code, respective 8192 sectors may be identified. FIG. 9 illustrates a case where P code of number 1 is assigned to the sector S1 as an example. FIG. 10 illustrates a case where P code of number 1 and S code of number 15 are assigned to the sector S1 as an example.

Configuration of Fixed Terminal

Hereinafter, the fixed terminal of Embodiment 3 will be described with reference to FIG. 6.

The CPICH processing unit 14 specifies the CPICH signal with a maximum reception level, among CPICH signals input from the wireless communication unit 12. Then, the CPICH processing unit 14 detects a scrambling code scrambling the CPICH signal with a maximum reception level, and outputs the number of the detected scrambling code (hereinafter, referred to as "code number") to the RACH processing unit 17. In other words, the CPICH processing unit 14 detects a scrambling code with the maximum reception level, among the received scrambling codes.

The RACH processing unit 17 controls the output start timing of the RA preamble to the wireless communication unit 12, based on the code number input from the CPICH processing unit 14. In other words, the RACH processing unit 17 controls the transmission start timing of the preamble signature for the fixed terminal, according to the scrambling code with the maximum reception level.

In other words, the RACH processing unit 17 stores association between a plurality of scrambling codes different from each other and a plurality of transmission timings different from each other. For example, the P code of "number 1" is associated with the transmission timing of "0 seconds of every minute", the P code of "number 2" is associated with the transmission timing of "10 seconds of every minute", and the P code of "number 3" is associated with the transmission timing of "20 seconds of every minute". Further, the P code of "number 4" is associated with the transmission timing of "30 seconds of every minute", the P code of "number 5" is associated with the transmission timing of "40 seconds of every minute", and the P code of "number 6" is associated with the transmission timing of "50 seconds of every minute".

Then, the RACH processing unit 17 starts the output of the RA preamble to the wireless communication unit 12 at the transmission timing corresponding to the code number input from the CPICH processing unit 14. Accordingly, for example, since the scrambling code with a maximum reception level is the P code of "number 3" in the fixed terminal 10 located in the sector S3 illustrated in FIG. 9, the preamble signature for the fixed terminal is transmitted from the wireless communication unit 12 at the time of "HH hours MM minutes 20 seconds". Further, for example, since the scrambling code with the maximum reception level is the P code of "number 5" in the fixed terminal 10 located in the sector S5 illustrated in FIG. 9, the preamble signature for the fixed terminal is transmitted from the wireless communication unit 12 at the time of "HH hours MM minutes 40 seconds". In this manner, it is possible to make the transmission start timings of the preamble signature for the fixed terminal deviate from each other between sectors, by associating the scrambling code and the transmission timing.

In addition, in the above description, the case of associating the P code and the transmission timing as an example has been described, but when the P code and the S code are assigned to each sector as in FIG. 10, the transmission start timing may be associated with a combination of the P code and the S code.

As described above, according to Embodiment 3, in the RACH processing unit 17, a plurality of transmission timings different from each other are respectively associated with a plurality of scrambling codes different from each other. The wireless communication unit 12 starts the transmission of the preamble signature for the fixed terminal at a transmission timing corresponding to the scrambling code with the maximum reception level, among a plurality of scrambling codes different from each other.

By doing so, since it is possible to vary the transmission start timings of the preamble signatures for each communication area, it is possible to avoid congestion of communication traffic in the wireless line.

In the above description, although the transmission start timing of the preamble signature for the fixed terminal is controlled, the mobile terminal 20 may also control the transmission start timing of the preamble signature for the mobile terminal in the same manner as the fixed terminal 10.

Embodiment 4

In Embodiment 3, the transmission start timings of the preamble signatures deviate from each other between sectors. In contrast, Embodiment 4 is different from Embodiment 3 in that the transmission start timings of the PRACH signals deviate from each other between sectors.

Configuration of Fixed Terminal

Hereinafter, a fixed terminal of Embodiment 4 will be described with reference to FIG. 6. Hereinafter, the redundant description of Embodiment 3 is omitted.

The RACH processing unit 17 controls the output timing of the PRACH signal to the wireless communication unit 12, based on the code number input from the CPICH processing unit 14. In other words, the RACH processing unit 17 controls the transmission timing of the PRACH signal, according to the scrambling code with the maximum reception level.

In other words, the RACH processing unit 17 stores association between a plurality of scrambling codes different from each other and a plurality of transmission timings different from each other. For example, the P code of "number 1" is associated with the transmission timing of a "timing of every 30 minutes+0 seconds", the P code of "number 2" is associated with the transmission timing of a "time of every 30 minute+10 seconds", and the P code of "number 3" is associated with the transmission timing of a "time of every 30 minute+20 seconds". Further, the P code of "number 4" is associated with the transmission timing of a "time of every 30 minute+30 seconds", the P code of "number 5" is associated with the transmission timing of a "time of every 30 minute+40 seconds", and the P code of "number 6" is associated with the transmission timing of a "time of every 30 minute+50 seconds".

Then, the RACH processing unit 17 outputs the PRACH signal to the wireless communication unit 12 at the transmission timing corresponding to the code number input from the CPICH processing unit 14. Accordingly, for example, since the scrambling code with a maximum reception level is the P code of "number 3" in the fixed terminal 10 located in the sector S3 illustrated in FIG. 9, the PRACH signal is transmitted at a "time of every 30 minute+20 seconds" from the wireless communication unit 12. Further, for example, since the scrambling code with the maximum reception level is the P code of "number 5" in the fixed terminal 10 located in the sector S5 illustrated in FIG. 9, the PRACH signal transmitted at "time of every 30 minute+40 seconds" from the wireless communication unit 12. In this manner, it is possible to make the transmission timings of the PRACH signals deviate from each other between sectors, by associating the scrambling code and the transmission timing.

In addition, in the above description, the case of associating the P code and the transmission start timing as an example has been described, but when the P code and the S code are assigned to each sector as FIG. 10, the transmission timing may be associated with a combination of the P code and the S code.

As described above, according to Embodiment 4, in the RACH processing unit 17, a plurality of transmission timings different from each other are associated with a plurality of scrambling codes different from each other. The wireless communication unit 12 transmits the PRACH signal at a transmission timing corresponding to the scrambling code with the maximum reception level, among a plurality of scrambling codes different from each other.

By doing so, since it is possible to vary the transmission timings of the PRACH signals for each communication area, it is possible to avoid congestion of communication traffic in the wireless line.

In addition, in the above description, although the fixed terminal 10 controls the transmission timing of the PRACH signal, the mobile terminal 20 may control the transmission timing of the PRACH signal in the same manner as the fixed terminal 10.

Other Embodiments

Figure 11:
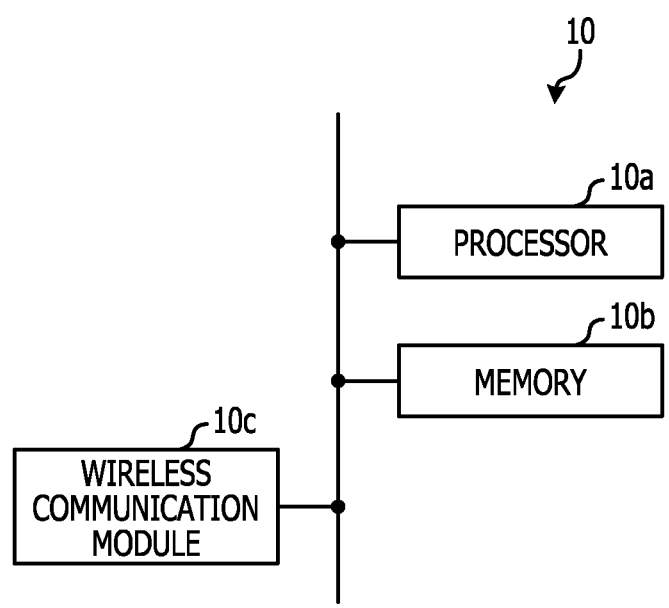
FIG. 11 is a diagram illustrating a hardware configuration example of the fixed terminal.

[1] The fixed terminal 10 may be realized, for example, by the following hardware configuration. FIG. 11 is a diagram illustrating a hardware configuration example of the fixed terminal. As illustrated in FIG. 11, the fixed terminal 10 includes a processor 10a, a memory 10b, and a wireless communication module 10c, as components of hardware. Examples of the processor 10a include a central processing unit (CPU), a digital signal processor (DSP), a field programmable gate array (FPGA), and the like. Further, the fixed terminal 10 may include a large scale integrated circuit (LSI) including the processor 10a and a peripheral circuit. Examples of the memory 10b include a random access memory (RAM) such as a synchronous dynamic random access memory (SDRAM), a read only memory (ROM), a flash memory, and the like. The antenna 11 and the wireless communication unit 12 are realized by the wireless communication module 10c. The BCH processing unit 13, the CPICH processing unit 14, the power consumption measurement unit 15, the measured value reporting unit 16, and the RACH processing unit 17 are realized by the processor 10a. Further, the BCH processing unit 13, the CPICH processing unit 14, the power consumption measurement unit 15, the measured value reporting unit 16, and the RACH processing unit 17 may include the memory 10b.

Figure 12:
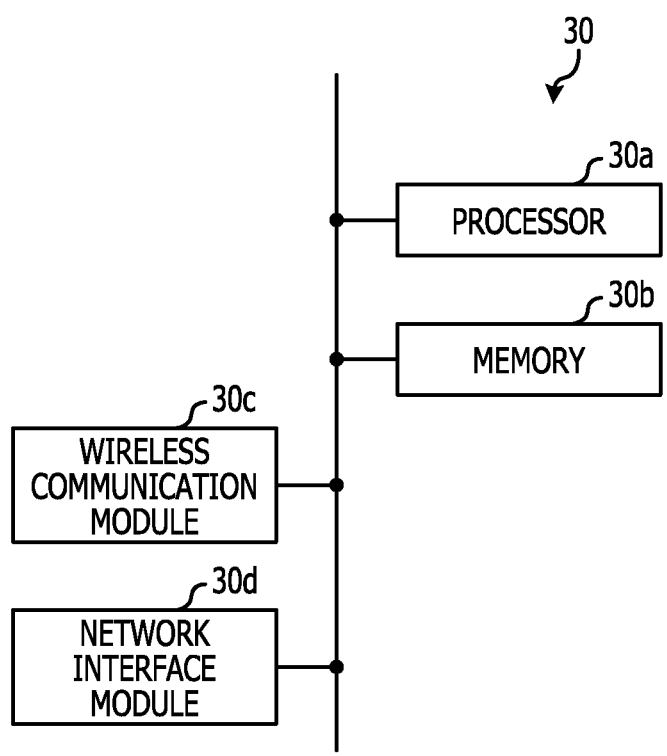
FIG. 12 is a diagram illustrating a hardware configuration example of the base station.

[2] The base station 30 may be realized, for example, by the following hardware configuration. FIG. 12 is a diagram illustrating a hardware configuration example of the base station. As illustrated in FIG. 12, the base station 30 includes a processor 30a, a memory 30b, a wireless communication module 30c, and a network interface module 30d, as components of hardware. Examples of the processor 30a include a CPU, a DSP, an FPGA, and the like. Further, the base station 30 may include an LSI including the processor 30a and a peripheral circuit. Examples of the memory 30b include a RAM such as an SDRAM, a ROM, a flash memory, and the like. The antenna 31 and the wireless communication unit 32 are realized by a wireless communication module 30c. The network interface unit 39 is realized by the network interface module 30d. The CPICH processing unit 33, the BCH processing unit 34, the RACH processing unit 35, the AICH processing unit 36, and the transmission control unit 37 are realized by the processor 30a. Further, the CPICH processing unit 33, the BCH processing unit 34, the RACH processing unit 35, the AICH processing unit 36, and the transmission control unit 37 may also have the memory 30b. The buffer 371 is realized by the memory 30b.

[3] Embodiment 3 and Embodiment 4 may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A communication system comprising:
a base station; and
a terminal configured to:
select a known signal from at least one first known signal included in a plurality of known signals that is divided into the at least one first known signal and at least one second known signal, each of the at least one first known signal indicating that the terminal transmits a following uplink signal including a specific data, each of the at least one second known signal indicating that the terminal transmits the following uplink signal not including the specific data, the following uplink signal being transmitted from the terminal to the base station in association with the selected known signal, and
transmit the selected known signal to the base station;
wherein
the at least one first known signal is for fixed terminals, and
the at least one second known signal is for mobile terminals.

2. A terminal comprising:
a memory; and
a processor coupled to the memory and configured to:
select a known signal from at least one first known signal included in a plurality of known signals that is divided into the at least one first known signal and at least one second known signal, each of the at least one first known signal indicating that the terminal transmits a following uplink signal including a specific data, each of the at least one second known signal indicating that the terminal transmits the following uplink signal not including the specific data, the following uplink signal being transmitted from the terminal to a base station in association with the selected known signal, and
transmit the selected known signal to the base station;
wherein
the at least one first known signal is for fixed terminals, and
the at least one second known signal is for mobile terminals.

3. The terminal according to claim 2, wherein
the processor is configured to:
measure a received power for each of a plurality of measurement signals, each of the plurality of measurement signals relating to each of a plurality of transmission timings that are different each other, and
transmit the selected known signal in one of the plurality of transmission timings related to one of the plurality of measurement signals whose received power is highest in the plurality of measurement signals.

4. The terminal according to claim 2, wherein
the processor is configured to:
measure a received power for each of a plurality of measurement signals, each of the plurality of measurement signals relating to each of a plurality of transmission timings that are different each other, and transmit the following uplink signal in one of the plurality of transmission timings related to one of the plurality of measurement signals whose received power is highest in the plurality of measurement signals.

5. The terminal according to claim 2, wherein the following uplink signal is transmitted on a common channel.

6. The terminal according to claim 2, wherein an additional uplink resource for transmitting the specific data is not allocated to the terminal.

7. The terminal according to claim 2, wherein an additional uplink resource, which is a dedicated resource for the terminal, for transmitting the specific data is not allocated to the terminal.

8. The terminal according to claim 2, wherein the processor is configured to:
receive a broadcast information notifying the at least one first known signal and the at least one second known signal, and
select the known signal based on the received broadcast information.

9. The terminal according to claim 2, wherein the following uplink signal is transmitted in response to a downlink response signal that is transmitted from the base station in response to the selected known signal.

10. The terminal according to claim 2, wherein the transmitting of the known signal is included in a procedure for starting dedicated communications between the terminal and the base station.

11. The terminal according to claim 2, wherein the specific data is transmitted in a spare area of the following uplink signal.

12. The terminal according to claim 2, wherein the plurality of known signals are a plurality of preamble signatures of Wideband Code Division Multiple Access (W-CDMA), and
the following uplink signal is a uplink signal on Physical Random Access Channel (PRACH) of W-CDMA.

13. A base station comprising:
a memory; and
a processor coupled to the memory and configured to:
receive a known signal from a terminal, the known signal being selected by the terminal from at least one first known signal included in a plurality of known signals that is divided into the at least one first known signal and at least one second known signal, each of the at least one first known signal indicating that the terminal transmits a following uplink signal including a specific data, each of the at least one second known signal indicating that the terminal transmits the following uplink signal not including the specific data, and
receive the following uplink signal that is transmitted from the terminal to a base station in association with the received known signal;
wherein
the at least one first known signal is for fixed terminals, and
the at least one second known signal is for mobile terminals.

14. The base station according to claim 13, wherein the processor is configured to determine whether to derive the specific data from the received following uplink signal or not based on the received known signal.

15. The base station according to claim 13, wherein the processor is configured to:
store the derived specific data to the memory, and
transmit the stored specific data to a control apparatus via a network in a timing specified in accordance with a load of the network.

16. The base station according to claim 13, wherein the processor is configured to:
store the derived specific data to the memory, and
transmit the stored specific data to a control apparatus via a network in a timing differing from each of other timings in which each of other base stations transmits the specific data to the control apparatus via the network.

\* \* \* \* \*